United States Patent
Inui et al.

(10) Patent No.: US 7,820,140 B2
(45) Date of Patent: Oct. 26, 2010

(54) THERMO-NEUTRAL REFORMING OF PETROLEUM-BASED LIQUID HYDROCARBONS

(75) Inventors: Tomoyuki Inui, Dhahran (SA); Bashir Osama Dabbousi, Dhahran (SA); Ahmeed Shakeel, Dhahran (SA); Fahad Ibrahim Al-Muhaish, Al-Khobar (SA); Mohammed Abdul Bari Siddqui, KFUPM Campus (SA)

(73) Assignee: Saudi Arabian Oil Company, Dhahran (SA)

( * ) Notice: Subject to any disclaimer, the term of this patent is extended or adjusted under 35 U.S.C. 154(b) by 608 days.

(21) Appl. No.: 11/792,769

(22) PCT Filed: Dec. 23, 2005

(86) PCT No.: PCT/US2005/047220

§ 371 (c)(1),
(2), (4) Date: Aug. 14, 2007

(87) PCT Pub. No.: WO2006/071927

PCT Pub. Date: Jul. 6, 2006

(65) Prior Publication Data

US 2008/0081018 A1    Apr. 3, 2008

Related U.S. Application Data

(60) Provisional application No. 60/638,533, filed on Dec. 23, 2004.

(51) Int. Cl.
*C01B 3/12* (2006.01)
*C01B 3/26* (2006.01)
*C01B 3/02* (2006.01)
*C07C 27/00* (2006.01)

(52) U.S. Cl. .................. 423/651; 423/648.1; 423/650; 518/702; 518/703; 518/704

(58) Field of Classification Search ................ 518/702, 518/703, 704; 423/648.1, 650, 651
See application file for complete search history.

(56) References Cited

U.S. PATENT DOCUMENTS

| | | | |
|---|---|---|---|
| 4,473,543 A | 9/1984 | Setzer et al. | |
| 4,650,651 A | 3/1987 | Fuderer | |
| 4,666,680 A | 5/1987 | Lewis | |
| 5,122,299 A | 6/1992 | LeBlanc | |
| 5,248,566 A | 9/1993 | Kumar et al. | |
| 5,762,658 A | 6/1998 | Edwards et al. | |
| 6,293,979 B1 | 9/2001 | Choudhary et al. | |
| 6,303,098 B1 | 10/2001 | Kramarz et al. | |
| 6,331,283 B1 | 12/2001 | Roy et al. | |
| 6,340,437 B1 | 1/2002 | Yagi et al. | |
| 6,375,916 B2 | 4/2002 | Christensen et al. | |
| 6,444,179 B1 | 9/2002 | Sederquist | |
| 6,713,040 B2 | 3/2004 | Ahmed et al. | |
| 2003/0003331 A1 | 1/2003 | Dabbousi et al. | |
| 2003/0042173 A1 | 3/2003 | Krumpelt et al. | |

FOREIGN PATENT DOCUMENTS

| | | |
|---|---|---|
| EP | 1 093 852 A1 | 4/2001 |
| JP | 05270802 A | 10/1993 |
| JP | 05270803 A | 10/1993 |
| JP | 08239201 A | 9/1996 |
| WO | WO 03/000827 A1 | 1/2003 |

OTHER PUBLICATIONS

Inui, "Rapid catalytic reforming of methane with CO2 and its application to other reactions," Appl. Organometal. Chem. 2001; 15: 87-94.
Inui et al., "Catalytic combustion of natural gas as the role of on-site heat supply in rapid catalytic CO2-H20 reforming of methane," Catalysis Today 26 (1995) 295-302.
Inui, "Spillover effect as the key concept for realizing rapid catalytic reactions," New Aspects of Spillover Effect in Catalysis, Elsevier, 1993, 17-26.

*Primary Examiner*—Jafar Parsa
(74) *Attorney, Agent, or Firm*—Abelman, Frayne & Schwab

(57) ABSTRACT

A method for the thermo-neutral reforming of liquid hydrocarbon fuels which employs a Ni—Ce$_2$O—Pt—Rh catalyst having dual functionalities to achieve both combustion and steam reforming.

15 Claims, 2 Drawing Sheets

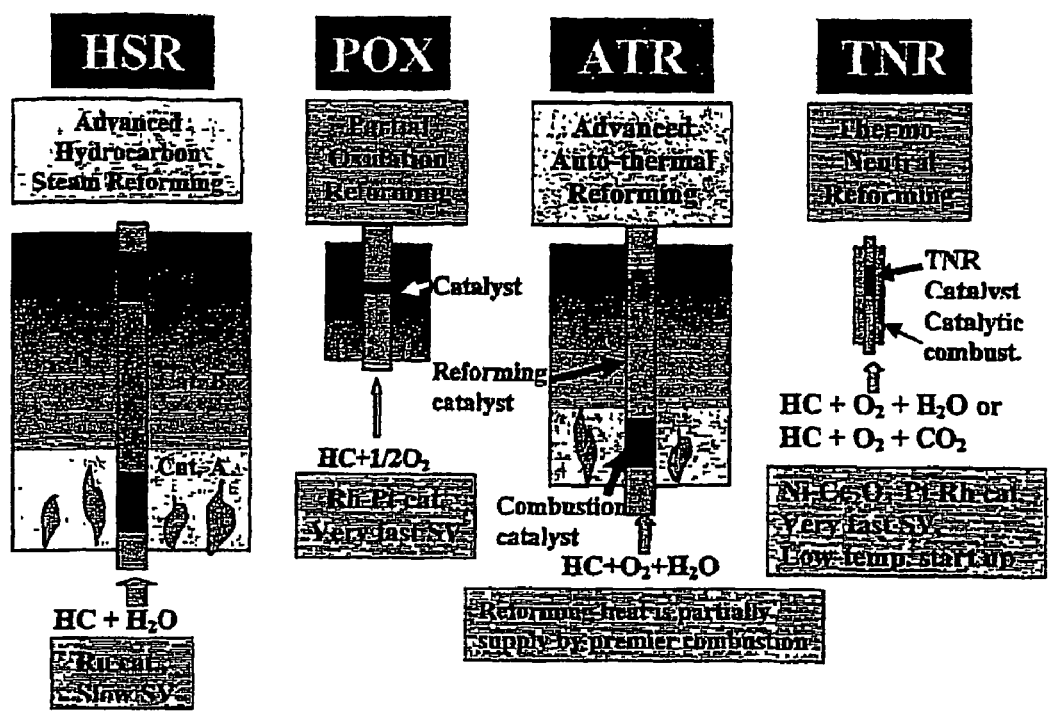
Fig.1: Schematic Comparison of Different Types of Reforming Processes

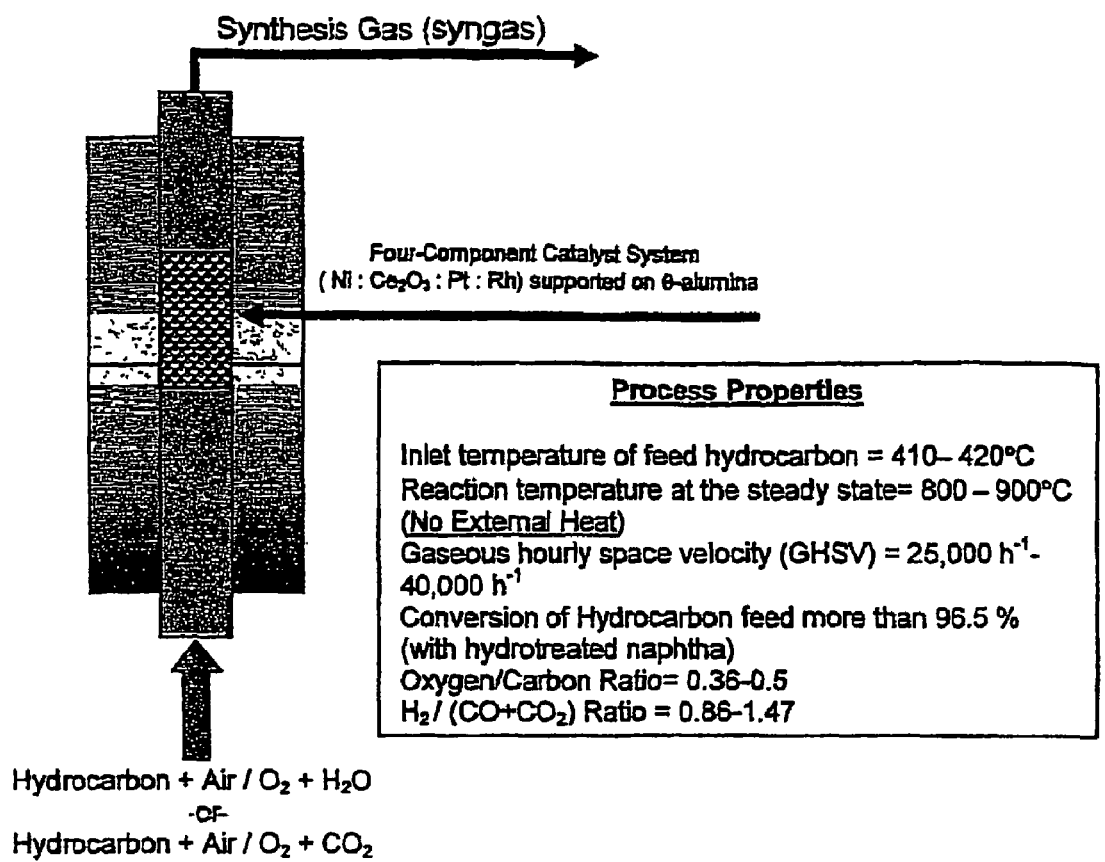
Fig.2: Petroleum-Based Thermo-Neutral Reforming Process

THERMO-NEUTRAL REFORMING OF PETROLEUM-BASED LIQUID HYDROCARBONS

CROSS-REFERENCE TO RELATED APPLICATIONS

This Application is a National Phase of PCT/US2005/047220, filed 23 Dec. 2005, which claims the benefit of U.S. Provisional Application 60/638,533, filed Dec. 23, 2004.

FIELD OF THE INVENTION

This invention relates to a thermo-neutral process for the reforming of petroleum-based liquid hydrocarbon fuels and, more specifically, to the use of a single catalyst having dual functionalities in such a process to achieve both combustion and steam and/or $CO_2$ reforming.

BACKGROUND OF THE INVENTION

Hydrogen-based fuel cells for automotive and stationary applications are gaining popularity for various reasons, including their higher efficiencies and lower emissions. However, using pure hydrogen as a fuel in automotive and residential applications has many limitations. The infrastructure to deliver hydrogen is presently inadequate, the refueling of gaseous hydrogen can be slow, and the safe storage of hydrogen is problematic. Hence, using an onboard reformer to produce a hydrogen rich stream from fuels like gasoline and methanol is gaining popularity. The alternatives of producing hydrogen range from futuristic solar energy-based hydrogen generation to more pragmatic hydrocarbon reforming. Use of liquid and/or gaseous hydrocarbon fuels to generate hydrogen is being proposed as an immediate solution for environmentally friendly energy production. Besides favorable economics and the relative ease of reforming, this option is more practical since the existing distribution network can be utilized.

The conversion of hydrocarbon fuels to hydrogen can be carried out by several processes, including hydrocarbon steam reforming (HSR), partial oxidation (POX), and auto-thermal reforming (ATR). Hydrocarbon steam reforming involves the reaction of steam with the fuel in the presence of a catalyst to produce hydrogen and CO as given in equations (1) and (2) for methane, $CH_4$, and isooctane, $C_8H_{18}$ (2,2,4-trimethylpentane which is used as a surrogate for gasoline). Since steam reforming is endothermic, some of the fuel must be burned in an external furnace and the heat transferred to the reformer via heat exchangers.

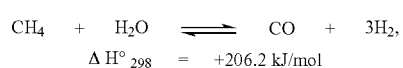

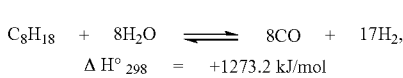

Partial oxidation involves the reaction of oxygen with fuel to produce hydrogen and CO as illustrated in equations (3) and (4), when the oxygen-to-fuel ratio is less than that required for total combustion, i.e., complete conversion to $CO_2$ and $H_2O$.

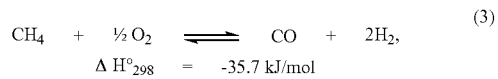

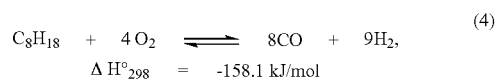

Partial oxidation can be conducted with a catalyst (catalytic partial oxidation) or without a catalyst (non-catalytic partial oxidation). The reaction rates are much higher for partial oxidation than for steam reforming, but the hydrogen yield per carbon in the fuel is lower. Non-catalytic partial oxidation requires reaction temperatures above 1000° C. to achieve rapid reaction rates. Although the reaction is exothermic, some of the fuel must be combusted because the amount of heat generated by the reaction is not sufficient to preheat the feed to achieve optimal rates. Recently, there has been interest in catalytic partial oxidation since it operates at lower temperatures than the non-catalytic route. The lower operating temperatures provide better control over the reaction, thus minimizing coke formation and allowing for a wider choice of materials of construction for the reactor.

Auto-thermal reforming involves the reaction of oxygen, steam, and fuel to produce hydrogen and $CO_2$, and can be viewed as a combination of partial oxidation and steam reforming as given in equations (5) and (6). In essence, this process can be viewed as a combination of POX and HSR.

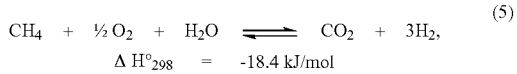

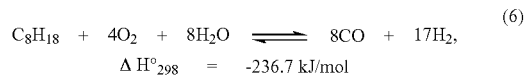

The choice of the reaction process to be used for on-board reforming depends on many factors, including the operating characteristics of the application (e.g., varying power demand, rapid start-up, and frequent shutdowns) and the type of fuel cell stack. HSR is heat transfer limited and as such does not respond rapidly to changes in the power demand (i.e. "load following"). When power demand rapidly decreases, the catalyst can overheat, causing sintering, which in turn results in a loss of activity. ATR can overcome the load following limitations of HSR, because the heat required for the endothermic reaction is generated within the catalyst bed, a property that allows for more rapid response to changing power demands and faster startup.

SUMMARY OF THE INVENTION

A novel, high gaseous hourly space velocity process, called thermo-neutral reforming (TNR), for the production of hydrogen-rich synthesis gas (syngas), has been found and applied to the reforming of petroleum-based, liquid hydrocarbon fuels, including iso-octane and naphtha. The process has the advantage of no detectable catalyst deactivation from coke formation or sulfidation by the action of distinct catalytic functions of both hydrogen- and oxygen-spillover effects.

The process of the invention combines catalytic functionalities of both combustion and steam and/or $CO_2$ reforming and uses a four-component catalyst with multiple functionalities. The catalyst has previously been applied to the reforming of natural gas, and liquefied petroleum gas (LPG) and has now been extended to the reforming of petroleum-based liquid hydrocarbon fuels. The process converts a reaction gas mixture, for example, consisting of 2.7 mol % iso-octane, 51.7 mol % air, and 46.6 mol % steam to produce a mixture containing 34.5 mol % $H_2$, 7.4 mot % CO, 9.3 mol % $CO_2$, 0.3 mol % $CH_4$, 25.5 mol % $N_2$, and 23.0 mol % steam. Dry gas containing 54.4 mol % of $H_2$ and CO is produced at greater than 96.5% conversion at a flow rate of 80 L/h. The syngas produced from this process can be used to produce approximately 80 watts (W) of electric power from a fuel cell operating at 40% efficiency.

BRIEF DESCRIPTION OF THE DRAWINGS

FIG. 1 is a schematic comparison of conventional types of reforming processes versus the reforming process of the present invention.

FIG. 2 is a detailed schematic representation of the thermo-neutral process of the present invention.

DETAILED DESCRIPTION OF THE INVENTION

The present invention comprehends the application of a novel high gaseous hourly space velocity (GHSV=25,000 $h^-$ to 40,000 $h^{-1}$) thermo-neutral reforming (TNR) process to the production of syngas from petroleum-based liquid hydrocarbon fuels. This invention solves the heretofore difficult task of reforming liquid hydrocarbons without coke formation.

By reference to FIG. 1, the advantages to be realized by the thermo-neutral reforming process of the present invention versus the conventional reforming process can be readily appreciated.

In auto-thermal reforming, even the most advanced versions, two kinds of catalyst beds, i.e., combustion catalyst and steam reforming catalyst are used in series. However, the thermal resistance of the catalyst support and catalyst ingredients limits the catalytic combustion to the maximum catalyst-bed temperature of 1000-1100° C.; a situation not essentially different from a priori homogeneous combustion.

By contrast, thermo-neutral reforming is conducted on the same catalyst surface upon which the combustion function and steam reforming function are configured in a good balance. The heat of combustion is then directly used instantaneously for the heat of reforming with minimal heat loss.

The process preferably uses a four-component composite catalyst Ni—$Ce_2O_3$—Pt—Rh (Ni:Ce:Pt:Rh atomic ratios=100:20:3:1) which has a reforming function, but which also facilitates catalytic combustion. Other catalysts which exhibit similar characteristics can also be used. The large exotherm produced from catalytic combustion elevates the catalyst to a temperature in the range from about 800° C. to about 900° C. Steam reforming and/or $CO_2$ reforming instantaneously increase to suppress an excessive rise in the catalyst temperature. This thermo-neutral process thereby enhances the reaction rate and catalyst stability.

The TNR process is very fast, greater than about 25,000 $h^{-1}$ and produces no detectable coke formation when processing liquid hydrocarbons containing less than 200 ppm sulfur and consisting of less than 1% aromatics.

It is preferred that the temperature for start-up at the inlet of the fuel processor or reactor is from about 380° C. to about 450° C., which is about 500° C. lower than conventional steam reforming. It is most preferred that the inlet temperature be from about 410° to about 420° C.

During steady-state operation, it is not necessary to supply additional heat to maintain the reaction system, because the heat required for the steam reforming is supplied in situ from the catalytic combustion reaction.

The catalyst possesses functionalities of both catalytic combustion and steam and/or $CO_2$ reforming on the same catalyst surface.

By the distinct spillover functions for both oxygen and hydrogen, precursors of coke formation and sulfur poisoning are oxidized and/or hydrogenated instantaneously and catalytic deactivation is prevented.

By supplying the proper ratio of a fuel, air, and steam mixture at a temperature range of about 410° C. to about 420° C., the catalyst-bed temperature increases within a very short period (within 20 seconds) to a reaction temperature in the range of about 800 to about 900° C., at the steady state. At this temperature the steam reforming reaction proceeds without the requirement for external heating.

A schematic representation of the process of the present invention is shown in FIG. 2. By means of the present process employing the combustion/reforming catalyst, significant yield increases of syngas are obtained when liquid feeds are employed compared with prior art processes without the detrimental effects of coke formation.

The exotherm caused by the catalytic combustion of fuel is neutralized and compensated automatically with the endotherm caused by steam reforming of hydrocarbons. This prevents an excessive rise of catalyst temperature and, therefore, the sintering of the catalyst metals and the transformation of the catalyst support to a non-porous state. These functions enhance catalyst stability.

The heat transfer between the exotherm and endotherm occurs directly in the catalyst bed. As a result, the required catalytic reactor volume for liquid hydrocarbon reforming in accordance with the method of the invention is less than 1/20 the size of a conventional steam reforming reactor and less than 1/10 the size of an auto-thermal reformer. Moreover, the large furnace needed to heat the reactor in conventional hydrocarbon steam reforming is not needed in the present process.

In the practice of the present process, over 96.5% of the feedstock is converted to syngas ($H_2$/CO/$CO_2$/$CH_4$) compared with only 85% conversion of liquid feeds when employing prior art processes.

The present invention can be utilized with a wide variety of fuels ranging from those which are gas-based, such as natural gas (NG) and liquefied petroleum gas (LPG), to petroleum-based liquid hydrocarbons, including naphtha, gasoline, kerosene and diesel fuel. The process can also be applied to non-petroleum fuels, such as methanol, ethanol, biodiesel and synthetic fuels (synfuels). It can be applied to a wide range of applications including synthesis gas (carbon monoxide+hydrogen) production, hydrocarbon-to-liquid conversion (HTL) using the Fischer-Tropsch reaction, methanol production, hydrogen feedstock for hydroprocessing, high purity hydrogen production for various applications, specialty chemicals, and reforming of liquid hydrocarbon fuels for fuel cell applications with capacities ranging from 100 W to several MW's using low temperature fuel cells (e.g., proton exchange membrane fuel cell (PEMFC)) and high temperature fuel cells (e.g., solid oxide fuel cells (SOFC) and molten carbonate fuel cells (MCFC)).

These systems can be applied to small size commodities, co-generation systems for domestic use and fuel cell vehicles. They can also be used to produce hydrogen rich reformate for hydrogen enrichment in internal combustion engines to reduce cold-start emissions and extend the useful range for exhaust gas recycle.

Example 1

A series of tests were carried out in a fixed-bed flow reactor system to demonstrate the process of the invention. The reaction system consisted of gas and liquid feed sections, a preheating section, a reactor section and a product collection section. Gases were fed through mass flow controllers; liquid feeds were pumped by precision HPLC pumps. The reactor tube was 12.6 mm in diameter and was made of Haynes 230 alloy material. A three-zone electric furnace, whose temperatures were monitored and controlled by temperature controllers, heated the reactor section. Thermocouples were provided to measure the inside temperature of the reactor. Water and hydrocarbons were vaporized in pr heaters and were mixed with air in a static mixer before entering the reactor. The product collection section consisted of a pressure control valve, gas-liquid separator, liquid level controller and a product tank.

A charge consisting of 10 ml of Ni—$Ce_2O_3$—Pt—Rh catalyst was loaded into the reactor. The catalyst bed was positioned at the center of the reactor tube between layers of inert silicon carbide. The top portion of the silicon carbide layer, also served as a preheating zone. The feed mixture was heated to 350° C. in the preheating zone. The reactor was heated to the staring temperature of 410° C. under nitrogen flow of 20 l/h. The water pump was switched on, and water was vaporized in a pre-heater and steam was admitted at a flow rate of 88.0 l/h. The hydrocarbon feed was introduced after a sufficient amount of water was collected in the product tank. Air was then fed into the reactor at a rate of 111 l/h. The temperature in the reactor rose to about 800°-900° C. in a few seconds. The tests continued for two hours after a steady state was achieved. Gas samples were collected and analyzed in two gas chromatographs, one equipped with a thermal conductivity detector (TCD) and the other with a flame ionization detector (FID). Percent conversion and product gas compositions were calculated from the GC results.

One test was carried out using iso-octane as the feed. The initial temperature of the catalyst bed was 410° C. The gas hourly space velocity was 34,129 $h^{-1}$, at a pressure of 2 bars, steam-to-carbon ratio of 2.1 and oxygen/carbon ratio of 0.507. The results are tabulated in Table 1.

TABLE 1

Summary of Results on Iso-Octane Feed

| Feed | unit | Iso-Octane |
| --- | --- | --- |
| Oxygen/Carbon | ratio | 0.507 |
| GHSV | $h^{-1}$ | 34,129 |
| Hydrocarbon conversion | % | 96.97 |
| Max. Temp | ° C. | 850 |
| Product Composition | | |
| $H_2$ | L/h (mol. %) | 54.7 (55.85) |
| CO | L/h (mol. %) | 24.4 (24.93) |
| $CO_2$ | L/h (mol. %) | 16.1 (16.45) |
| $CH_4$ | L/h (mol. %) | 2.72 (2.77) |
| $H_2/CO + CO_2$ | L/h (mol. %) | 1.35 |

Example 2

This example illustrates the process for the catalytic conversion of a naphtha feed having a sulfur content of 200 ppm into syngas, the details of which are described in Example 1. The gas hourly space velocity was 26,507 $h^{-1}$, the steam flow rate was 146.1 l/h, the air flow rate was 111 l/h, the pressure was 2 bars, the steam-to-carbon ratio was 2.1 and the oxygen/carbon ratio was 0.367. The results are tabulated in Table 2.

TABLE 2

Summary of Experimental Results On Light Naphtha Feed (less than 200 ppm sulfur)

| Feed | unit | Light Naphtha (<200 ppm S) |
| --- | --- | --- |
| Oxygen/Carbon | ratio | 0.367 |
| GHSV | $h^{-1}$ | 26,507 |
| Hydrocarbon conversion | % | 73.0 |
| Max. Temp | ° C. | 850 |
| Product Composition | | |
| $H_2$ | L/h (mol. %) | 26.8 (40.34) |
| CO | L/h (mol. %) | 19.2 (28.94) |
| $CO_2$ | L/h (mol. %) | 11.8 (17.82) |
| $CH_4$ | L/h (mol. %) | 3.77 (5.68) |
| $H_2/CO + CO_2$ | L/h (mol. %) | 0.86 |

Example 3

This example illustrates the process for the catalytic conversion of a light naphtha feed having a sulfur content of less than 1 ppm, to syngas, the details of which are described in Example 1. The gas hourly space velocity was 24,997 $h^{-1}$, the steam flow rate was 69.7 l/h, the air flow rate was 75.3 l/h, the pressure was 2 bars, the steam-to-carbon ratio was 2.1, and the oxygen/carbon ratio was 0.486. The results are tabulated in Table 3.

TABLE 3

Summary of Experimental Results on Light Naphtha Feed

| Feed | unit | Light Naphtha (<1 ppm S) |
| --- | --- | --- |
| Oxygen/Carbon | ratio | 0.486 |
| GHSV | $h^{-1}$ | 24997 |
| Hydrocarbon conversion | % | 97.0 |
| Max. Temp | ° C. | 880 |
| Product Composition | | |
| $H_2$ | L/h (mol. %) | 36.2 (58.5) |
| CO | L/h (mol. %) | 5.9 (9.6) |
| $CO_2$ | L/h (mol. %) | 16.2 (26.1) |
| $CH_4$ | L/h (mol. %) | 3.6 (5.8) |
| $H_2/CO + CO_2$ | L/h (mol. %) | 1.640 |

Example 4

This example illustrates the process for the catalytic conversion of a heavy naphtha feed having a sulfur content of less than 10 ppm to syngas, the details of which are described in Example 1. The gas hourly space velocity was 39,144 $h^{-1}$, the steam flow rate was 118.5 l/h, the air flow rate was 110 l/h, the pressure was 2 bars, the steam to carbon ratio was 2.1, and the oxygen/carbon ratio was 0.42. The results are tabulated in Table 4.

TABLE 4

Summary of Experimental Results on Naphtha Feed

| Feed | Unit | Heavy Naphtha (<10 ppm S) |
|---|---|---|
| Oxygen/Carbon | ratio | 0.42 |
| GHSV | h$^{-1}$ | 39,144 |
| Hydrocarbon conversion | % | 99 |
| Max. Temp | °C. | 900 |
| Product Composition | | |
| H$_2$ | L/h (mol. %) | 59.03 (57.70) |
| CO | L/h (mol. %) | 21.38 (20.90) |
| CO$_2$ | L/h (mol. %) | 20.85 (20.38) |
| CH$_4$ | L/h (mol. %) | 1.04 (1.02) |
| H$_2$/CO + CO$_2$ | L/h (mol. %) | 1.40 |

We claim:

1. A single stage thermo-neutral reforming process for the production of a hydrogen-rich synthesis gas from liquid hydrocarbon fuels, which comprises:
   a) providing a mixture of a liquid hydrocarbon fuel, air and steam to an interior zone of a reactor, said interior zone including a catalyst bed consisting of a Ni—Ce$_2$O$_3$—Pt-Rh combined combustion and steam and/or CO$_2$ reforming catalyst;
   b) pre-heating the mixture at a temperature of about 380° C. to about 450° C. to form a vapor; and,
   c) bringing the heated vaporized mixture into contact with the catalyst bed at a gas hour space velocity of about 25,000 h$^{-1}$ or greater causing an exothermic combustion reaction raising the reaction temperature to about 800° C. to about 900° C. and also causing an endothermic steam reforming reaction for a period of time sufficient to reform the liquid fuel to yield a hydrogen-rich synthesis gas.

2. The process of claim 1, wherein the liquid hydrocarbon fuel is a petroleum-based fuel.

3. The process of claim 2, wherein the petroleum-based liquid is selected from the group consisting of iso-octane, light naphtha, heavy-naphtha, kerosene and diesel.

4. The process of claim 1, wherein the gas hour space velocity is between about 25,000 and about 40,000 h$^{-1}$.

5. The process of claim 1, wherein the pre-heating temperature is from about 410° C. to about 420° C.

6. The process of claim 1, wherein the heat generated from the exothermic combustion reaction is neutralized and compensated by the endothermic reaction on the same catalyst bed.

7. The process of claim 1, wherein the reaction is carried out without the need of an external heat supply.

8. The process of claim 1, wherein coke formation is avoided.

9. The process of claim 3, wherein over 96.5% of iso-octane and light naphtha feedstocks are converted into syngas (H$_2$ZCOZCO$_2$ZCl—I$_4$).

10. The process of claim 3, wherein over 99% of heavy naphtha feedstock is converted into syngas (H$_2$ZCOZCO$_2$ZCH$_4$).

11. The process of claim 1, wherein the syngas produced from the process can be further purified to produce highly pure hydrogen.

12. The process of claim 1, wherein the hydrogen rich syngas is used as a feed for on-board reformers in vehicles incorporating a high temperature or low temperature fuel cell.

13. The process of claim 1, wherein the hydrogen-rich syngas is used as a feed for hydrogen enrichment in internal combustion engines.

14. The process of claim 1, wherein the hydrogen-rich syngas is employed in stationary applications.

15. The process of claim 1, wherein the sulfur content of the liquid hydrocarbons fuel is 200 ppm or less.

* * * * *